C. H. WEBER & J. L. BROWN.
MANURE SPREADER.
APPLICATION FILED APR. 10, 1908.

918,232.

Patented Apr. 13, 1909.
2 SHEETS—SHEET 1.

Witnesses
Carl Stoughton
Frank J. Campbell

Inventors
Charles H. Weber
and John L. Brown.
By Chester C. Shephard
Attorney

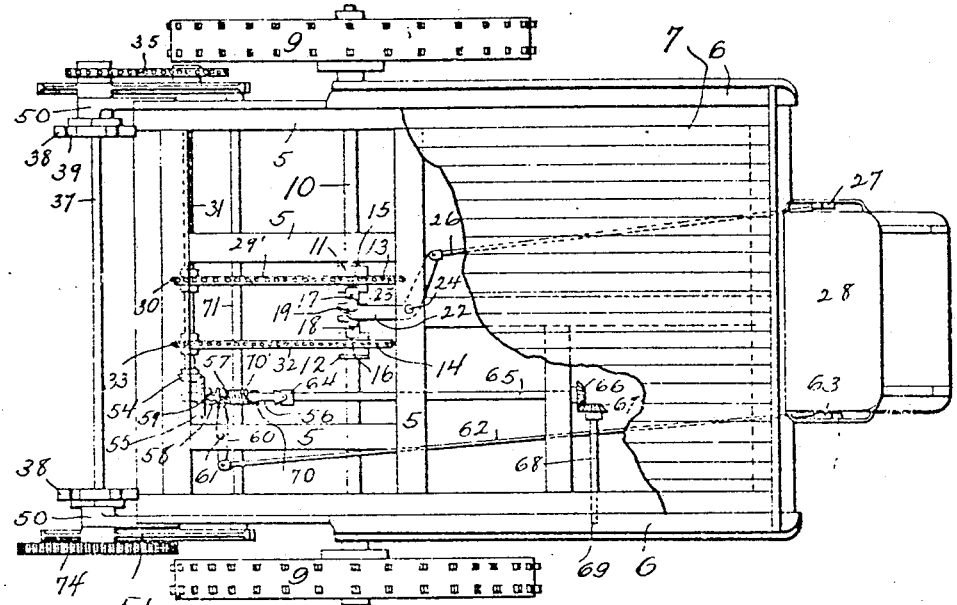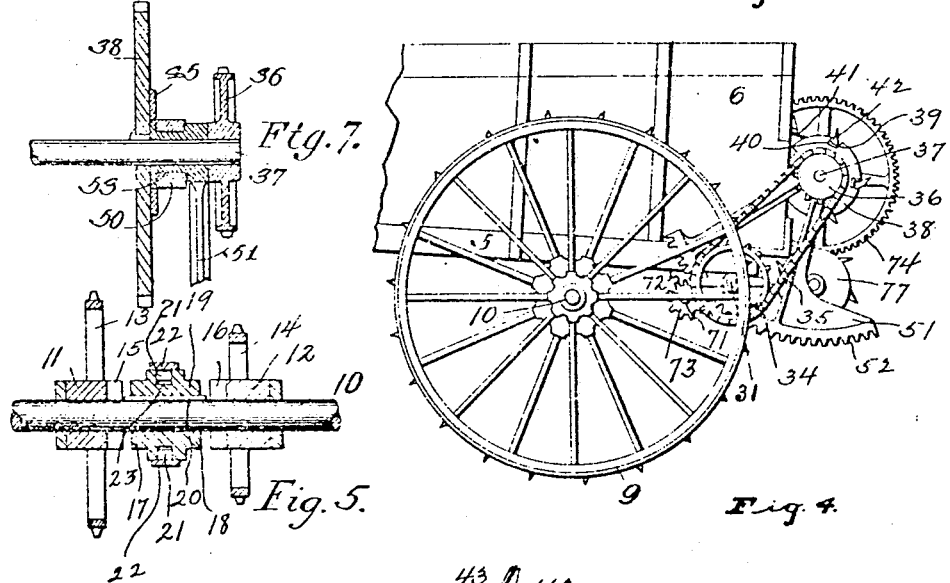

UNITED STATES PATENT OFFICE.

CHARLES H. WEBER, OF ALTON, AND JOHN L. BROWN, OF COLUMBUS, OHIO.

MANURE-SPREADER.

No. 918,232.　　　　Specification of Letters Patent.　　　Patented April 13, 1909.

Application filed April 10, 1908. Serial No. 426,336.

*To all whom it may concern:*

Be it known that we, CHARLES H. WEBER and JOHN L. BROWN, citizens of the United States, residing, respectively, at Alton and Columbus, in the county of Franklin and State of Ohio, have invented certain new and useful Improvements in Manure-Spreaders, of which the following is a specification.

Our invention relates to manure spreaders and has for its object the provision of a device of this character constructed in such manner that the load may be fed to a beater located at the rear of the machine without the use of the usual traveling bottom for the vehicle.

A further object of the invention is to provide means for varying the rate of speed at which the load will be fed to the beater and consequently for varying the amount of manure distributed upon any given area of ground.

Further objects and advantages of the invention will be set forth in the detailed description which now follows.

Figure 1:
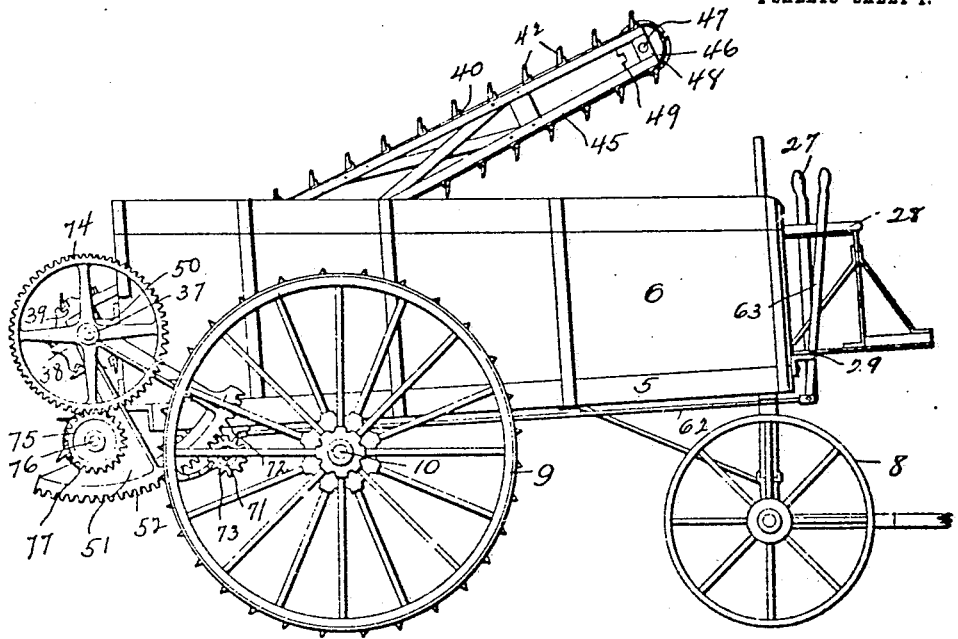
Figure 2:
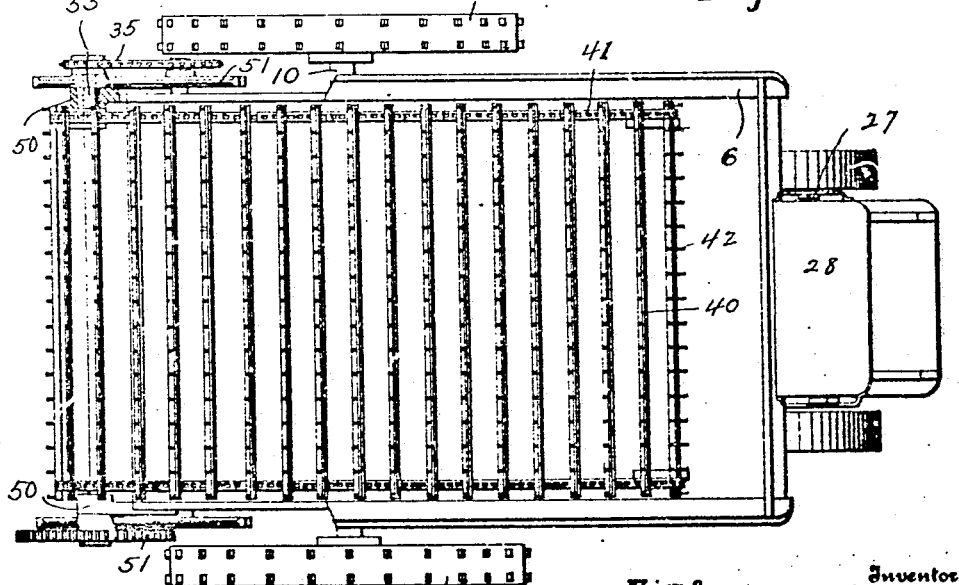

In the accompanying drawings: Figure 1 is a side elevation of a machine constructed in accordance with the invention, Fig. 2 is a plan view with certain of the parts broken away, Fig. 3 is a plan view with the endless feeding apron hereinafter described removed and with the bottom of the vehicle body broken away, Fig. 4 is a partial side elevation looking from the opposite side of the machine from that shown in Fig. 1, Fig. 5 is a detail view of a clutch mechanism hereinafter described, Fig. 6 is a detail perspective view of one of the angle irons comprising the endless feeding apron and of one of the teeth carried by said angle irons and Fig. 7 is a detail sectional view through one end of a shaft, hereinafter described.

Like numerals designate corresponding parts in all of the figures of the drawing.

Referring to the drawing and particularly to Fig. 3, the numerals 5 designate the sills of the wagon bed, the numerals 6 designate the sides thereof and the numeral 7 designates the bottom of said wagon bed. This body is mounted upon front wheels 8 of the usual and well known construction and upon rear wheels 9, said rear wheels being spurred in the usual manner of vehicles of this character. Rotation of the rear wheels 9 is adapted to impart rotation to a shaft 10 which extends transversely of the wagon bed, it being understood that this is accomplished by a ratchet connection between the shaft 10 and the rear wheels 9. This ratchet connection has not been illustrated, for such connections are common in mowers and reapers and other agricultural machinery and forms no part of the present invention.

The hubs 11 and 12 of sprocket wheels 13 and 14 are cut out as at 15 and 16 to be engaged by teeth 17 and 18 of a sliding clutch member 19. This clutch member is splined upon the shaft 10 by a feather key 20 and is adapted to be shifted longitudinally upon said shaft by pins 21 which are carried by the end of a bell crank lever 22, said bell crank lever being forked and said pins entering an annular groove 23 formed in the body portion of the clutch 19. The bell crank lever 22 is pivoted as at 24 to one of the sills 5 of the wagon and the other arm of the bell crank lever is connected by a rod 26 with a handle 27, said handle being located at the left hand end of the driver's seat indicated at 28 and said handle being pivoted as at 29. It will be seen that when the handle 27 is thrown forwardly, the bell crank lever will be rocked upon its pivot 24 to throw the tooth 17 into engagement with the hub of the sprocket wheel 13 and that when said handle is thrown rearwardly, the tooth 18 will be thrown into engagement with the hub of the sprocket wheel 14, it being apparent that since the clutch member 19 is splined to the shaft, it will always rotate with the shaft and when thrown into engagement with either of the sprocket wheels, will impart motion to said sprocket wheel.

The sprocket wheel 13 is connected by a sprocket chain 29' with a sprocket wheel 30 which is fast upon a transverse shaft 31, while the sprocket wheel 14 is connected by a sprocket chain 32 with a small sprocket wheel 33, this latter sprocket wheel likewise being fast upon the shaft 31. Since the sprocket wheel 13 is considerably larger than the sprocket wheel 14, it follows that when the clutch 19 is thrown to such position as to connect the shaft 10 with the sprocket 13, the shaft 31 will rotate at a considerably faster rate of speed than when the shaft 10 is locked to the sprocket wheel 14. The shaft 31 carries at its outer end a sprocket wheel 34 and a sprocket chain 35 connects the sprocket wheel 34 with a second sprocket wheel 36 which is mounted upon the end of a shaft 37. A pair of disks 38 are secured to this shaft and rotate therewith (see Figs. 3 and 4).

These disks are cut out as at 39 for the reception of the ends of angle bars 40, there being a large number of these angle bars and said angle bars being connected together by a chain 41. These angle bars carry teeth 42, said teeth being provided with ears 43 through which rivets 44 or like fastening devices may be passed to secure the teeth to the bars.

A skeleton frame 45 is provided with bearings 46 at its upper end for the reception of a shaft 47 and this shaft carries disks 48 which are similar in form to the disks 38 and these disks 48 are cut out as at 49 for the reception of the angle bars in the same manner that the disks 38 are cut out for a like purpose.

The shaft 37 is supported in bearings 50. Segments 51 lie outside of these bearings and are provided along their lower faces with gear teeth 52. These segments have sleeves 53 formed therewith and these sleeves extend through the bearings 50, (see Fig. 2) and are connected at the inner sides of said bearings with the skeleton frame 45. It will therefore be seen that bodily rocking movement of the segments on the shaft 37 will elevate or depress the skeleton frame 45 bodily, the rear end of said frame being supported upon the shaft 37.

The shaft 31 carries a bevel pinion 54 and this bevel pinion meshes with a bevel gear wheel 55. This latter gear wheel is loosely mounted upon a shaft 56 and is adapted to be connected to said shaft by a clutch member 57, said clutch member being splined upon the shaft in the same manner that the clutch member 19 is splined upon the shaft 10 and said clutch member being provided with a tooth 58 which is adapted to engage a cut-out portion 59 of the hub of the bevel gear wheel 55. A lever 60 which is pivoted at 61 to one of the sills 5 of the wagon bed is adapted to shift the clutch member 57 when motion is imparted thereto through a rod 62. This rod 62 is connected to a lever 63 which is controllable from the driver's seat. A universal joint 64 connects the shaft 56 with the shaft 65. The reason for employing a universal joint at this point, is the fact that the shaft 56 lies in a substantially horizontal plane, while the shaft 65 follows the angle of the bottom of the body portion and passes through and is journaled in the sills 5. The shaft 65 carries at its forward end a bevel pinion 66 and this bevel pinion in turn meshes with another bevel pinion 67 which is fast upon the shaft 68. The outer end of this shaft 68 is square as at 69 to permit of a suitable tool being applied thereto, to manually rotate the shaft 68 for a purpose which will be hereinafter set forth.

The shaft 56 carries a worm 70′ and this worm meshes with a worm wheel 70 which is fast upon a transverse shaft 71. This transverse shaft is mounted in bearings 72 and carries at its outer ends pinions 73 which mesh with the gear teeth formed upon the lower faces of the segments 51. Mounted upon the right hand end of the shaft 37 when looking toward the front of the wagon, is a large gear wheel 74 and this gear wheel meshes with a pinion 75 which is fast upon a shaft 76 and this shaft carries a beater 77. The ratio of the gear wheel 74 to the pinion 75 is three to one. In other words, the beater will rotate three times as fast as the shaft 37.

The operation of the device is as follows: When the wagon is drawn forward, rotation is imparted to the shaft 10 and through the sprocket and chain connections to the shaft 31. From this shaft, motion is imparted through the medium of the sprocket wheel 34, chain 35, and sprockets 36 to the shaft 37 and from said shaft to the beater through the connections described. The beater rotates toward the right in Fig. 4, while the gear wheel 74 rotates toward the left in said figure. This will cause the teeth at the lower side of the endless feeding apron to engage the load and drag it toward the beater. As the load is fed to the beater, the rotation of the pinion 73 moves the segments rearwardly to move the endless feeding apron down upon the load. It is to be understood that the pitch of the worm gear 69 and the fact that the pinion 54 is smaller than the gear wheel 55, causes the pinions 73 to rotate very slowly indeed and the downward movement of the endless feeding apron is a very gradual one. As has been before stated, the amount of manure distributed over any given area, may be controlled by throwing the clutch 19 into engagement either with the high speed sprocket 13, or the low speed sprocket 14. After the endless feeding apron has moved down to its limit of movement and the load has been entirely distributed, the operator by moving the handle 63 can disengage the shaft 56 from the bevel gear wheel 55 by throwing the clutch to the position illustrated in Fig. 3. The operator may then apply a crank or other suitable tool to the square end 69 of the shaft 68 to impart rotation to said shaft and consequently to the shafts 65 and 71 to thereby again elevate the endless feeding apron.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What we claim, is:

1. In a device of the character described, the combination with a body portion, of supporting wheels for said body portion, an endless moving apron adapted to be fed bodily down upon the load, means for driving said apron from the driving wheels of the body portion, a frame for supporting the feeding apron, segments connected to said frame, and means actuated from the supporting wheels for actuating said segments.

2. In a manure spreader, the combination with a wheeled body portion, of an endless feeding apron carrying members adapted to engage the load, means actuated from the wheels of the body portion for feeding said endless feeding apron bodily down upon the load, a high speed connection between said endless feeding apron and the driving wheels, a low speed connection between the endless feeding apron and the driving wheels, and means controllable from the driver's seat for throwing either of said connections into or out of operation.

3. In a device of the character described, the combination with a body portion, of supporting wheels for said body portion, a transversely disposed shaft mounted at the rear end of said body portion, a change speed gearing interposed between the supporting wheels and said shaft, said gearing being adapted to impart rotation to said shaft from the supporting wheels, a skeleton supporting frame mounted to swing bodily from said shaft, toothed segments depending from said supporting frame, an endless apron carried by said supporting frame, the movement of said segments being adapted to impart bodily movement to said frame, means for actuating said segments from the supporting wheels, and a manually operable means for actuating said segments.

4. In a device of the character described, the combination with a body portion, of supporting wheels for said body portion, a transversely disposed shaft mounted at the rear end of said body portion, a change speed gearing interposed between the supporting wheels and said shaft, said gearing being adapted to impart rotation to said shaft from the supporting wheels, a skeleton supporting frame mounted to swing bodily from said shaft, toothed segments depending from said supporting frame, an endless apron carried by said supporting frame, the movement of said segments being adapted to impart bodily movement to said frame, means for actuating said segments from the supporting wheels and a manually operable means for actuating said segments, said endwise apron comprising a plurality of L shaped angle bars arranged transversely thereof and teeth secured to upstanding portions of said angle bars.

In testimony whereof we affix our signatures in presence of two witnesses.

CHARLES H. WEBER.
JOHN L. BROWN.

Witnesses:
L. CARL STOUGHTON,
A. L. PHELPS.